US012651961B2

(12) United States Patent
Wang et al.

(10) Patent No.: US 12,651,961 B2
(45) Date of Patent: Jun. 9, 2026

(54) APPARATUS AND METHOD FOR LIMITING INRUSH CURRENT AND EXTENDING HOLD-UP TIME IN AN AC-DC POWER CONVERSION APPARATUS

(71) Applicant: HUAWEI TECHNOLOGIES CO., LTD., Guangdong (CN)

(72) Inventors: Luyu Wang, Shenzhen (CN); Shuyu Ou, Shenzhen (CN); Chao Wu, Dongguan (CN); Wenbo Sun, Dongguan (CN); Grover Victor Torrico-Bascopé, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 18/399,724

(22) Filed: Dec. 29, 2023

(65) Prior Publication Data

US 2024/0136917 A1 Apr. 25, 2024

Related U.S. Application Data

(63) Continuation of application No. PCT/EP2021/068340, filed on Jul. 2, 2021.

(51) Int. Cl.
H02M 3/07 (2006.01)
H02M 1/00 (2006.01)
(Continued)

(52) U.S. Cl.
CPC ............. H02M 1/36 (2013.01); H02M 1/007 (2021.05); H02M 1/0095 (2021.05);
(Continued)

(58) Field of Classification Search
CPC ............ H02M 3/07; H02M 3/02; H02M 3/04; H02M 3/072; H02M 3/071; H02M 3/158;
(Continued)

(56) References Cited

U.S. PATENT DOCUMENTS

| | | | |
|---|---|---|---|
| 7,061,212 B2 | 6/2006 | Phadke | |
| 2013/0082666 A1* | 4/2013 | Tsai | H02M 1/4208 323/207 |
| 2013/0201729 A1* | 8/2013 | Ahsanuzzaman | H02M 3/33507 363/21.12 |

OTHER PUBLICATIONS

A.A. Ashaibi et al, "Switched mode power supplies for charge-up, discharge and balancing do-link capacitors of diode-clamped five-level inverter", IET Power Electron., 2010, vol. 3, Iss. 4, doi :10.1049/iet-pel.20080335, ISSN 1755-4535, XP006035843, total 18 pages.

(Continued)

*Primary Examiner* — Nguyen Tran

(57) ABSTRACT

An AC-DC power converter has a power factor correction stage that receives grid power and produces DC bus power. A DC-DC converter stage receives the DC bus power and produces a DC output power. Energy storage is provided by a larger capacitance value first capacitor and a smaller capacitance value second capacitor coupled in series across the DC bus power with a switching device coupled in parallel with the smaller second capacitor. During converter start-up, the switching device is turned off and inrush current is controlled by transferring energy from the second capacitor to the first capacitor. During operation the switching device is turned on and the first capacitor provides energy storage for the DC bus power. When grid power is disconnected, hold-up time is extended by turning the switching device off and transferring energy from the first capacitor to the second capacitor.

16 Claims, 12 Drawing Sheets

(51) Int. Cl.
| | |
|---|---|
| *H02M 1/36* | (2007.01) |
| *H02M 1/42* | (2007.01) |
| *H02M 3/158* | (2006.01) |
| *H02M 7/217* | (2006.01) |

(52) U.S. Cl.
CPC ........... *H02M 1/4208* (2013.01); *H02M 3/07* (2013.01); *H02M 3/158* (2013.01); *H02M 7/217* (2013.01); *H02M 1/0096* (2021.05)

(58) Field of Classification Search
CPC .... H02M 3/1582; H02M 3/1854; H02M 1/36; H02M 1/38; H02M 1/0077; H02M 1/008; H02M 1/0067; H02M 1/0095; H02M 1/0096; H02M 1/4208; H02M 7/217; H02M 7/2176; H02M 7/155; H02M 7/17
See application file for complete search history.

(56) References Cited

OTHER PUBLICATIONS

Kang-Hyun Yi et al, "A hold-up time compensation circuit for PWM front-end DC/DC converters", 2009 IEEE Energy Conversion Congress and Exposition, total 4 pages.

Yuan yisheng, "A New PFC Converter with Reduced Output Bus Capacitors", 2010 2nd IEEE International Symposium on Power Electronics for Distributed Generation Systems, total 3 pages.

Woo-Young Choi et al, "A Novel Single-Stage AC-DC Converter to Supply Sustain Power for Plasma Display Panels", Journal of Display Technology, vol. 7, No. 9, Sep. 2011, total 9 pages.

Huang-Jen Chiu et al, "A Single-Stage Soft-Switching Flyback Converter for Power-Factor-Correction Applications", IEEE Transactions on Industrial Electronics Jul. 2010 Impact Factor: 6.5 DOI: 10.1109/TIE.2009.2033622 • Source: IEEE Xplore, total 5 pages.

Chili-Chiang Hua et al, "Bridgeless Boost Power Factor Correction Rectifier with Hold-Up Time Extension Circuit", World Academy of Science, Engineering and Technology International Journal of Electronics and Communication Engineering Vol:10, No. 10, 2016, total 4 pages.

Mingxuan Qi et al, "Design and Benchmark of Capacitive DC Links for the Hold-up Time Application", 2019 IEEE 10th International Symposium on Power Electronics for Distributed Generation Systems (PEDG), total 6 pages.

ETSI EN 300 132-3 V1.2.1 (Mar. 2003), Environmental Engineering (EE); Power supply interface at the input to telecommunications equipment; Part 3: Operated by rectified current source, alternating current source or direct current source up to 400 V, total 18 pages.

Yungtaek Jang et al, "Hold-Up Time Extension Circuit With Integrated Magnetics", IEEE Transactions on Power Electronics, vol. 21, No. 2, Mar. 2006, total 7 pages.

IEC 61000-3-2, Edition 5.0 Jan. 2018, Electromagnetic compatibility (EMC)—Part 3-2: Limits—Limits for harmonic current emissions (equipment input, Compatibilitéélectromagnétique (CEM)—Partie 3-2: Limites—Limites pour les émissions de courant harmonique (courant appelé par les appareils ≤ 16 A par phase) IEC current ≤ 16 A per phase), total 78 pages.

Yang Chen et al, "LCLC resonant converter for hold up mode operation", 2015 IEEE Energy Conversion Congress and Exposition (ECCE), total 8 pages.

* cited by examiner

600

1100

1200

APPARATUS AND METHOD FOR LIMITING INRUSH CURRENT AND EXTENDING HOLD-UP TIME IN AN AC-DC POWER CONVERSION APPARATUS

CROSS-REFERENCE TO RELATED APPLICATIONS

This application is a continuation of International Application PCT/EP2021/068340, filed on Jul. 2, 2021, the disclosure of which is hereby incorporated by reference in its entirety.

TECHNICAL FIELD

The aspects of the disclosed embodiments relate generally to power conversion apparatus, and more particularly to power factor corrected AC-DC power converters.

BACKGROUND

Capacity of modern data centers is continually increasing, leading to a need for power supplies having high power density and high efficiency. Conventional power supplies achieve about 100 watts per cubic inch with an efficiency around 96 percent. However, the trend toward higher data center capacities gives rise to a need for power densities approaching 150 watts per cubic inch or more while maintaining the same or better efficiency as conventional lower density supplies.

A typical AC-DC power supply, also referred to as a power converter, includes several stages such as an input filter, a power factor correction (PFC) stage, and a DC-DC conversion stage, along with energy storage components and inrush limiting circuitry. The energy storage, typically applied to an internal DC bus, uses a bus capacitor to store energy, increase holdup time, and provide filtering. A positive temperature coefficient (PTC) resistive element and a relay are often included to limit inrush current.

Increased switching frequencies can reduce the size of the input filter components but do not help reduce size of the bus capacitor. In a typical AC-DC power converter, the bus capacitor accounts for about one third of the size of the supply, with the PTC and relay contributing significant additional volume. Conventional solutions, which tend to address inrush current and hold-up time separately, increase size and reduce efficiency of the AC-DC power converter.

SUMMARY

The aspects of the disclosed embodiments are directed to an AC-DC power conversion apparatus employing a bus capacitor that includes a series connected pair of capacitors, one capacitor having a capacitance value larger than the other, and an energy transfer unit configured to limit inrush current and extend hold-up time by transferring energy between the two capacitors. The aspects of the disclosed embodiments provide efficient high-density AC-DC power conversion apparatus enhanced by a novel dual bus capacitor topology and a novel energy transfer unit configured to limit inrush current and extend hold-up time of the AC-DC power conversion apparatus. This and other advantage are addressed by the subject matter of the independent claims. Further advantageous modifications can be found in the dependent claims.

According to a first aspect, the above and further aspects and advantages are obtained by an apparatus. In one embodiment, the apparatus includes a power factor correction stage configured to receive a grid power and produce a DC bus power, and a DC-to-DC conversion stage configured to receive the DC bus power and produce a DC output power. The DC bus power includes a positive DC bus and a negative DC bus. A first capacitor is coupled in series with a second capacitor between the positive DC bus and the negative DC bus forming a central node between the first capacitor and the second capacitor. A capacitance value of the first capacitor is greater than a capacitance value of the second capacitor, and a first switching device is coupled in parallel with the second capacitor. The apparatus includes an energy transfer unit coupled to the DC bus power and to the first central node, the energy transfer unit being configured to operate the first switching device and to transfer energy between the first capacitor and the second capacitor. The energy transfer and bus capacitor topology allow inrush current to be controlled and hold-up time to be extended using the same energy transfer circuit.

In a possible implementation form of the apparatus, a capacitance value of the first capacitor is at least fifty (50) times greater than a capacitance value of the second capacitor. Using a second capacitor with a capacitance value that is much smaller than the first capacitor increases the benefits gained from controlling the energy transfer.

In a possible implementation form of the apparatus, the energy transfer unit is further configured to, when the grid power is connected, turn off the first switching device and control an inrush current by transferring energy from the second capacitor to the first capacitor. Controlling or limiting the inrush current reduces stress on converter components, and can reduce cost, improve reliability, and help fulfil regulatory requirements imposed by local authorities.

In a possible implementation form of the apparatus, when the grid power is disconnected, the energy transfer unit is configured to turn off the first switching device and increase a hold up time by transferring energy from the first capacitor to the second capacitor. Extending hold-up time in this fashion provides a necessary amount of hold-up time, typically greater than about fifteen milliseconds, to be achieved with a smaller amount of bus capacitance thereby improving power density of the converter.

In a possible implementation form of the apparatus, the energy transfer unit includes a second switching device coupled in series with a third switching device between the positive DC bus and the negative DC bus, with a second central node being formed between the second switching device and the third switching device. An inductor is coupled between the first central node and the second central node. The apparatus includes a controller configured to operate the first switching device, the second switching device and the third switching device. The controller is configured to turn off the first switching device, and to transfer energy between the first capacitor and the second capacitor by operating the second switching device and the third switching device. The use of an inductor and two switching devices provides simple and reliable means for pumping or transferring energy between the first and second capacitors.

In a possible implementation form of the apparatus, the controller is configured to, when the grid power is connected and a voltage of the second capacitor is greater than an inrush threshold, hold the first switching device in an off state and operate the second switching device and the third switching device to transfer energy from the second capacitor to the first capacitor. When a voltage of the second capacitor is less than or equal to the inrush threshold the controller turns on the first switching device, turns off the second switching device, and turns off the third switching device. Switching from inrush current limiting operation to the more efficient normal supply mode based on comparing the second capacitor voltage to a threshold provides a simple and effective means of determining when to transition from the start-up mode to the more efficient normal converter operation.

In a possible implementation form of the apparatus, the controller is configured to, when the grid power is disconnected, turn off the first switching device and operate the second switching device and the third switching device to transfer energy from the first capacitor to the second capacitor. When the voltage of the second capacitor is greater than or equal to a holdup threshold, the controller turns off the first switching device, turns off the second switching device, and turns off the third switching device. Applying a threshold to the second capacitor provides a simple and effective means of determining when to end the energy transfer thereby preventing generation of excessive amounts of current.

In a possible implementation form of the apparatus, the energy transfer unit is configured to transfer energy between the second capacitor and the first capacitor based on a current loop. The current loop is configured to produce a current error signal by subtracting an inductor current from a reference current; produce a current control signal by applying a current compensation algorithm to the current error signal; produce a feed forward signal by dividing the voltage of the second capacitor by the bus voltage; produce a switch control signal by adding the current error signal and the feed forward signal; and produce a second switch control signal and a third switch control signal by modulating the switch control signal with a carrier signal. The second switch control signal and the third switch control signal are configured to operate the second switching device and the third switching device. Using a current control loop allows direct regulation and limiting of the inrush current.

In a possible implementation form of the apparatus, the current compensation algorithm includes one of a proportional algorithm, a proportional plus integral algorithm, a proportional plus integral plus derivative algorithm, a type II algorithm, and a type III algorithm. Use of easily analyzed control algorithms simplifies design and provides stable robust controller operation.

In a possible implementation form of the apparatus, the reference current comprises a predetermined reference current value. Use of a constant predetermined reference current value ensures inrush current does not exceed deign parameters during converter start-up.

In a possible implementation form of the apparatus, the energy transfer unit is configured to transfer energy from the first capacitor to the second capacitor based on a voltage loop. The voltage loop is configured to produce a voltage error signal by subtracting the bus voltage from a voltage reference signal and produce the reference current by applying a voltage compensation algorithm to the voltage error signal. Controlling energy transfer based on a voltage loop ensures the bus voltage remains above an acceptable operating value for as long as the stored energy will allow.

In possible implementation form of the apparatus, the voltage compensation algorithm comprises one of a proportional algorithm, a proportional plus integral algorithm, a proportional plus integral plus derivative algorithm, a type II algorithm, and a type III algorithm. Use of easily analyzed control algorithms simplifies design and provides stable robust controller operation.

In a possible implementation form of the apparatus, the first capacitor is connected to the positive DC bus and the second capacitor is connected to the negative DC bus. This capacitor arrangement enables energy transfer between the two capacitors.

In a possible implementation form of the apparatus, the first capacitor is connected to the negative DC bus and the second capacitor is connected to the positive DC bus. Reversing locations of the first and second capacitor provides design flexibility.

In a possible implementation form of the apparatus, the carrier signal is one of a sawtooth signal and a triangle signal. Energy transfer can be achieved using a variety of appropriate modulation techniques thereby allowing additional design flexibility.

According to a second aspect, the above and further advantages are obtained by a method for operating an AC-DC power conversion apparatus. The exemplary method is adapted to limit inrush current and extend hold-up time in an AC-DC power conversion apparatus having high power density and high efficiency. In one embodiment the power conversion apparatus includes a power factor correction stage configured to receive a grid power and produce a DC bus power, a DC-DC conversion stage configured to receive the DC bus power and produce a DC output power, a first capacitor and a second capacitor connected in series across the DC bus power, and a switching device connected in parallel with the second capacitor. A capacitance value of the first capacitor is larger than a capacitance value of the second capacitor. In one embodiment method includes connecting the grid power to the power factor correction stage; turning the switching device off; and transferring an energy from the second capacitor to the first capacitor based on a current control loop. When a voltage of the second capacitor is less than or equal to an inrush threshold, the method includes turning the switching device on and discontinuing the transfer of energy from the second capacitor to the first capacitor. The energy transfer methodology allows inrush current to be controlled using a simple circuit topology based on two series coupled capacitors each having different capacitance values.

In a possible implementation form of the method, the method further includes: operating the power conversion apparatus in a normal power supply mode and when a loss of the grid power is detected, turning the switching device off and transferring energy from the first capacitor to the second capacitor based on a voltage control loop. When a voltage of the second capacitor is greater than a holdup threshold, energy transfer from the first capacitor to the second capacitor is discontinued. The energy transfer methodology allows inrush current to be control and hold-up time to be extended by applying different energy transfer methods with a single simple circuit topology.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which like references indicate like elements and.

DETAILED DESCRIPTION OF THE DISCLOSED EMBODIMENTS

Figure 1:
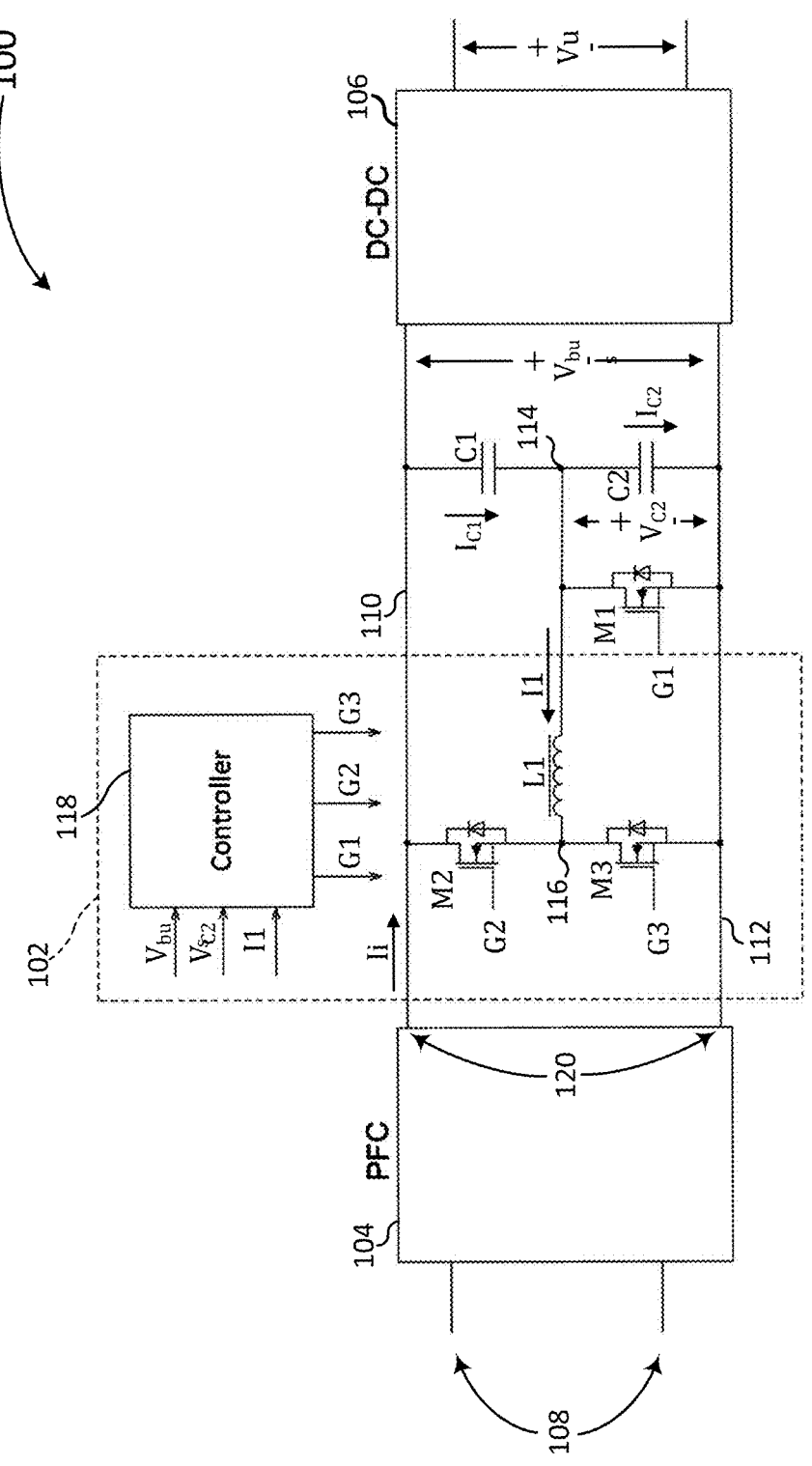
FIG. 1 illustrates a schematic block diagram of an exemplary AC-DC power conversion apparatus incorporating aspects of the disclosed embodiments.

Referring to FIG. 1, a simplified schematic block diagram of an exemplary AC-DC power conversion apparatus 100 is illustrated. The apparatus 100 of the disclosed embodiments is directed to an improved AC-DC power conversion apparatus incorporating an improved energy storage topology configured to limit inrush current and extend hold-up time while improving power density and maintaining converter efficiency. The apparatus 100 is appropriate for converting grid power to conditioned DC power, such as for use in data centers or other applications requiring large amounts of DC power.

As shown in FIG. 1, the apparatus 100 includes a power factor correction stage (PFC) 104 configured to receive an AC grid power 108 and produce a DC bus power 120 where the DC bus power 120 has a DC voltage $V_{bus}$. The DC bus power includes a positive DC bus 110, also referred to as positive DC power rail, and a negative DC bus 112 also referred to as a negative DC power rail.

The AC grid power 108 may be any suitable AC power such as the locally available grid power or other suitable AC power. The term "grid power" or "AC grid power" as used herein generally refers to any suitable AC power source, such as the locally available 60 hertz grid power available in north America or the 50 hertz grid power available in many European countries. In alternate embodiment, the desired grid power may also be supplied by any suitable AC power generation apparatus, such as backup power generators, solar and wind arrays, etc.

The PFC 104 provides rectification to convert AC grid power 108 to DC power 120 and includes power factor correction to improve the ratio of real power to apparent power. In certain embodiments it may be desirable to include an input filter stage (not shown) between the PFC 104 and the grid power 108 to reduce high frequency noise transferred to or from the grid power 108 and the PFC stage 104.

A DC-DC conversion stage 106 is configured to receive the DC bus power 120 and produce an output DC power Vu which may be delivered to the desired load (not shown). Any suitable DC-DC conversion stage may be advantageously employed to convert DC bus power to appropriately regulated and conditioned DC output power Vu.

Energy storage is provided for the DC bus power 120 by a pair of series connected capacitors C1 and C2. The first capacitor C1 is coupled in series with the second capacitor C2 with the series coupling connected across the positive DC bus 110 and the negative DC bus 112. A first central node 114 is formed between the first capacitor C1 and the second capacitor C2. As will be discussed further below, a capacitance value of the first capacitor C1 is greater than the capacitance value of the second capacitor C2. In certain embodiments the capacitance value of the first capacitor C1 may be much greater than, such as 50, 100, or more times, the capacitance value of the second capacitor C2.

A first switching device M1 is coupled in parallel with the second capacitor C2. Turning the first switching device M1 on shorts the second capacitor C2 and effectively removes the second capacitor C2 from the circuit. Turning the first switching device M1 off couples the series connected pair of capacitors C1 and C2 across the DC bus power 120. Because the second capacitor C2 has a smaller capacitance value than the first capacitor C1, the series connected pair of capacitors C1 and C2 presents a much smaller capacitance to the DC bus power than the first capacitor C1 alone, as is the case when the first switching device M1 is on.

The apparatus 100 includes an energy transfer unit 102 coupled to the DC bus power 120, namely the positive DC bus power 110 and negative DC bus power 112, and to the central node 114. The energy transfer unit 102 is configured to pump energy between the central node 114 and either the positive DC bus 110 or the negative DC bus 112, thereby transferring energy between the first capacitor C1 and the second capacitor C2.

As will be discussed further below, transferring energy during converter start-up from the second capacitor C2 to the first capacitor C1 provide means for limiting the inrush current Ii of the apparatus 100. Transferring energy during converter shut-down from the first capacitor C1 to the second capacitor C2 provides a means for extending hold-up time of the apparatus 100.

The term "inrush current" is generally used to refer to the current entering a power conversion apparatus from the grid power, which in the apparatus 100 would be the current entering the PFC stage 104 from the grid power 108. For the purposes of the present disclosure and as an aid to understanding, the current Ii entering the DC bus power 108 from the PFC stage 104 will be referred to herein as the inrush current Ii, and the current entering the PFC stage 104 from the grid power 108 will be referred to as input inrush current. Those skilled in the art will recognize that controlling the inrush current Ii will similarly control the input inrush current entering the power conversion apparatus 100 from the grid power 108.

During converter start-up, which is a period following connection of grid power 108 to the apparatus 100, the energy transfer unit 102 is configured to turn the first switching device M1 off and to transfer energy from the second capacitor C2 to the first capacitor C1. Appropriate control of energy transferred from the second capacitor C2 to the first capacitor C1 allows the inrush current Ii to be limited to a beneficially low value. This controlled energy transfer can be viewed as trickle charging of the first capacitor C1. Once the first capacitor C1 is sufficiently charged, the energy transfer unit 102 can stop the energy transfer and turn on the first switching device M1. This effectively removes the smaller capacitance value second capacitor C2 from the circuit allowing the converter apparatus 100 to operate in a normal power supply mode where the larger capacitance value capacitor C1 provides energy storage for the DC bus power 120.

While the apparatus 100 is operating in a normal power supply mode, the first switching device M1 is turned on and the energy transfer unit 102 is not transferring energy. During normal power supply mode, the grid power 108 may become disconnected from the apparatus 100 either intentionally or due to an unexpected loss of grid power 108 such as due to a power outage of the local power grid. When grid power 108 is disconnected, the energy transfer unit 102 is configured to turn the first switching device M1 on and begin transferring energy from the first capacitor C1 to the second capacitor C2. Transferring energy from the first capacitor C1 to the second capacitor C2 allows the energy transfer unit 102 to extend the hold-up time of the apparatus 100. Because the first capacitor C1 is larger, meaning the first capacitor C1 has a larger capacitance value, removing an amount of energy from the first capacitor C1 reduces the voltage across the first capacitor C1 by a small amount. However, due to the second capacitor C2 having a smaller capacitance value than the first capacitor C1, adding the energy removed from the first capacitor C1 to the second capacitor C2 increases the voltage $V_{C2}$ across the second capacitor C2 by a greater amount than the voltage lost by the first capacitor C1. Thus, transferring energy from the first capacitor C1 to the second capacitor C2 can maintain the voltage $V_{bus}$ of the DC bus power 120 and extend the hold-up time of the apparatus 100.

The exemplary energy transfer unit 102 illustrated in FIG. 1 includes a second switching device M2 and a third switching device M3 coupled in series across the positive DC bus 110 and the negative DC bus 112, with a second central node 116 being formed between the second switching device M2 and the third switching device M3. An inductor L1 couples the first central node 114 with the second central node 116.

A controller 118 is included in the energy transfer unit 102 and is configured to operate the first switching device M1, the second switching device M2, and the third switching device M3. The controller 118 receives control signals which contain information about the bus voltage $V_{bus}$, the voltage of the second capacitor $V_{C2}$, and the inductor current I1. As will be discussed further below, the controller 118 implements various logic functions, control loops, and modulation operations to create switch control signals G1, G2, G3. The switch control signals G1, G2, G3 are configured to operate, i.e., turn on and off, the first switching device M1, the second switching device M2, and the third switching device M3, respectively.

The controller 118 is configured to turn off the first switching device M1 during certain start-up and shut-down periods or states. While the first switching device M1 is turned off, the controller 118 modulates the second and third switch control signals G2, G3 to operate the second switching device M2 and the third switching device M3 and transfer energy between the first capacitor C1 and the second capacitor C2. The energy transfer is configured to limit inrush current during start-up of the apparatus 100 and to extend hold-up time after grid power has been removed from the apparatus 100.

In the exemplary embodiment illustrated in FIG. 1, the switching devices M1, M2, and M3, are illustrated as semiconductor switching devices, and more particularly as metal oxide semiconductor field effect transistors (MOSFET). However, those skilled in the art will readily recognize that any type of switching device capable of efficiently switching the desired power at the desired frequencies may be advantageously employed in the exemplary apparatus 100 without straying from the spirit and scope of the present disclosure.

Figure 2:
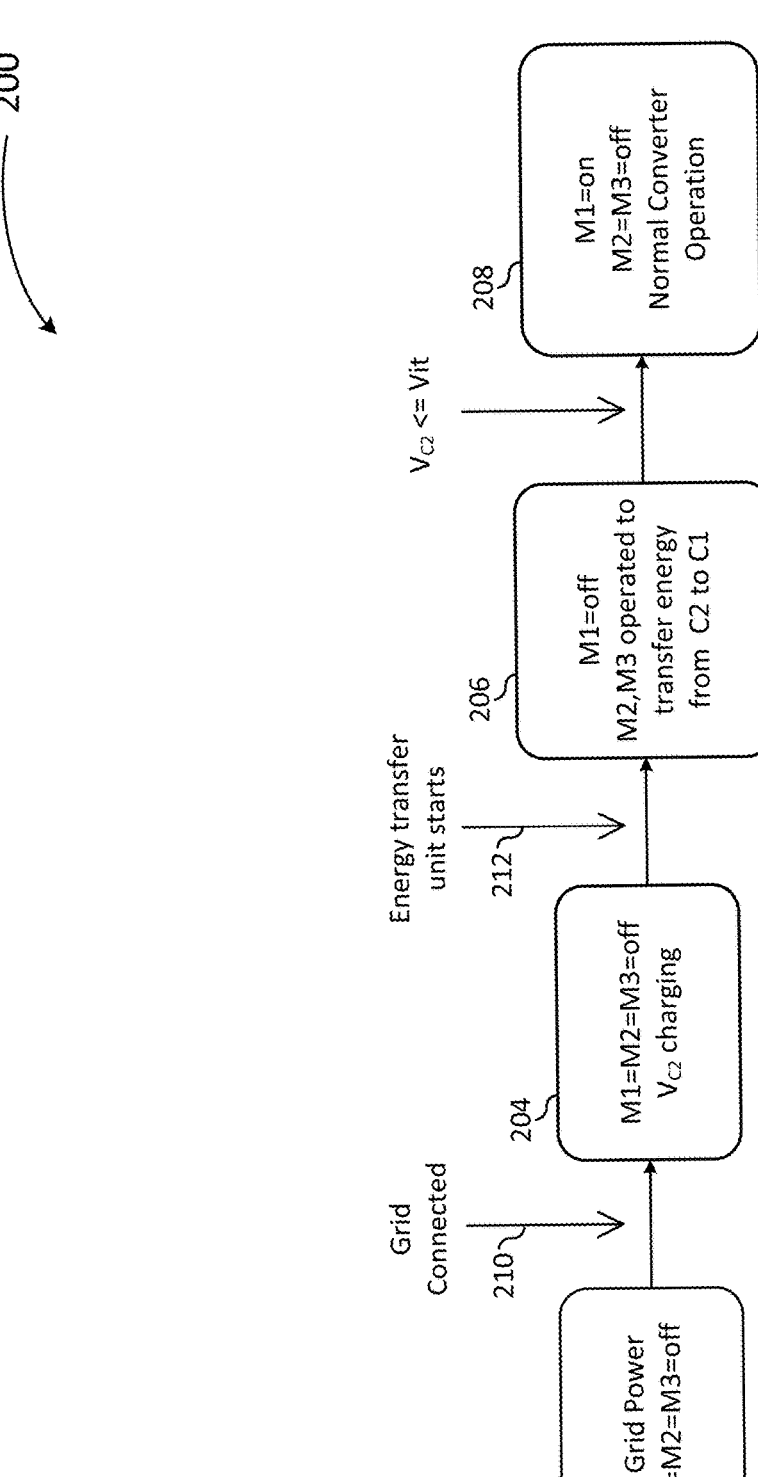
FIG. 2 illustrates a state chart depicting operational states of an exemplary AC-DC power conversion apparatus incorporating aspects of the disclosed embodiments.

FIG. 2 illustrates a state chart 200 depicting operational states of an exemplary AC-DC power conversion apparatus incorporating aspects of the disclosed embodiments. The exemplary state chart 200 depicts operational states and state transitions undergone by an AC-DC power conversion apparatus, such as the exemplary apparatus 100 described above, during a start-up phase encompassing connection of grid power through normal converter operation. The start-up phase takes a power conversion apparatus from an initial state 202, where grid power is disconnected and there in no energy in the apparatus 100, through connection of grid power 210 and finally to achieving normal converter operation 208 where the converter is operating in a steady state delivering a stable output DC power Vu to a load.

Prior to connecting grid power 108, the apparatus 100 is in the initial state 202 where there is no energy in the system. In the initial state 202, both capacitors C1, C2 are discharge and, the controller 118 is not operating. All control signals G1, G2, G3 are off and the corresponding switching devices M1, M2, M3 are off. As used herein a "switching device" is referred to as "off" or in an "off state" when it is not conducting current and is referred to as "on" or in an "on state" when it is conducting current.

When grid power is connected 210, the apparatus 100 transitions to a second state 204. During the second state 204 power begins to flow into the apparatus 100, the controller 118 has not yet begun to operate and the three switching devices M1, M2, M3 remain off while the grid power 108 begins to energize the apparatus 100. As noted above, when the first switching device M1 is off, the first capacitor C1 and smaller capacitance value second capacitor C2 are coupled in series and begin to charge. Because the second capacitor C2 has a relatively small capacitance value as compared to the first capacitor C1, the series coupled first capacitor C1 and second capacitor C2 begin to charge quickly without generating an undesirably large inrush current.

The energy transfer unit 102 begins to operate 212 and the apparatus 100 transitions to a third operating state 206. During the third start-up state 206 the controller 118 continues to hold the first switching device M1 in its off state thereby maintaining the series coupling of the first capacitor C1 and the second capacitor C2 across the DC bus 120.

As will be discussed further below, while in the third operating state 206, the controller 118 operates the second switching device M2 and the third switching device M3 to transfer energy from the second capacitor C2 to the first capacitor C1. Appropriately controlling this energy transfer allows the inrush current Ii to be maintained at an acceptably low value and gradually reduces the voltage of the second capacitor $V_{C2}$.

When the voltage of the second capacitor $V_{C2}$ becomes less than or equal to the predetermined inrush threshold $V_{C2}<=Vit$, the apparatus 100 transitions to normal converter operation 208 where it operates as a high efficiency DC power supply. During normal converter operation 208, the first switching device M1 is turned on thereby shorting the second capacitor C2 and effectively removing the smaller capacitance value second capacitor C2 from the circuit. With the second capacitor C2 shorted, the larger capacitance valued first capacitor C1 is now coupled directly across the DC bus 120. The controller 118 stops transferring energy during normal converter operation 208 and turns both the second switching device M2 and the third switching device M3 off. In the normal operating state 208, the energy transfer unit 102 is not operating and uses little or no power.

Figure 3:
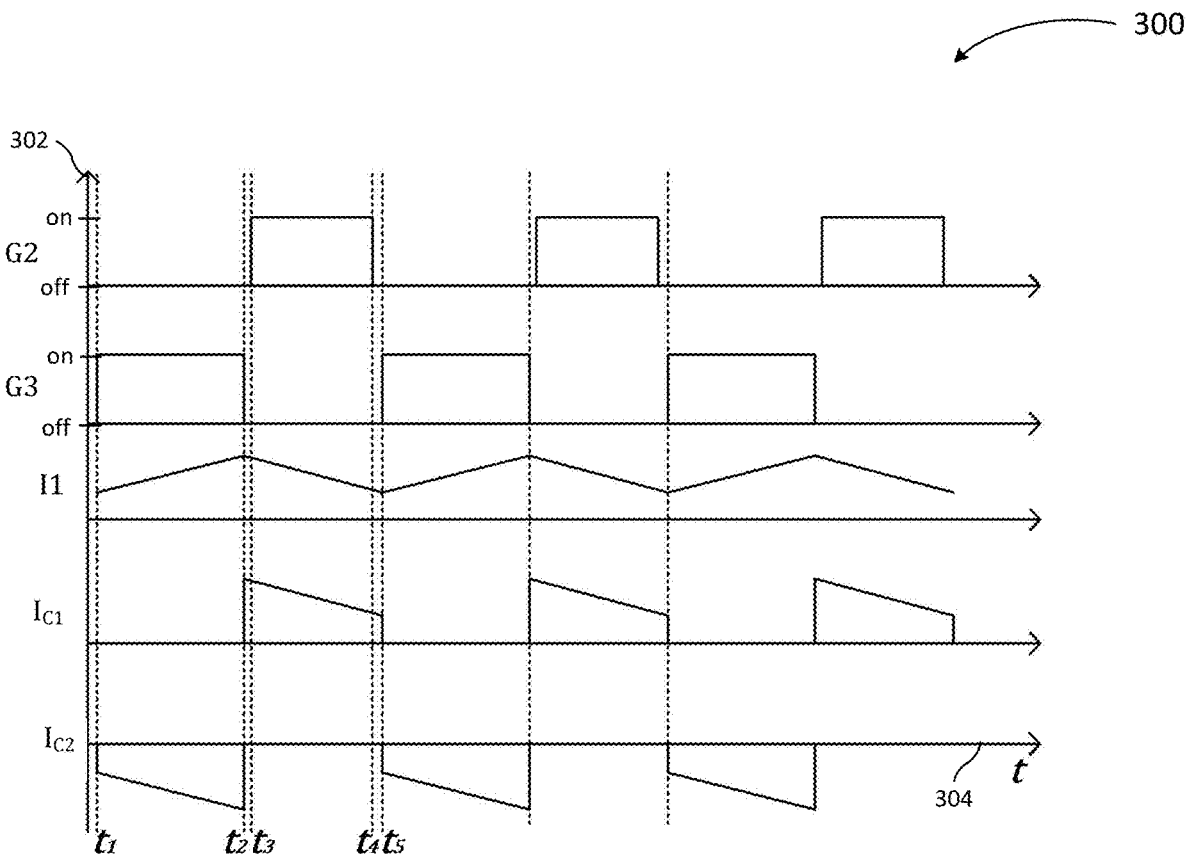
FIG. 3 illustrates a graph depicting primary waveforms of an exemplary energy transfer unit incorporating aspects of the disclosed embodiments.

FIG. 3 illustrates graphs depicting primary waveforms 300 of an exemplary energy transfer unit 102 incorporating aspects of the disclosed embodiments. The exemplary primary waveforms 300 are generated by the energy transfer unit 102 during the third start-up state 206 and are configured to transfer energy from the second capacitor C2 to the first capacitor C1. In the graphs 300, time is depicted along a horizontal axis 304 increasing to the right, and signal magnitude is depicted along a vertical axis increasing upwards. The top two graphs G2 and G3 show control signals used to operate the second switching device M2 and the third switching device M3, respectively. For convenience, the graphs G2 and G3 are labeled according to the on or off state of the corresponding switching device M2 and M3, respectively. The bottom three graphs I1, $I_{C1}$, $I_{C2}$ depict current through the inductor L1, current through the first capacitor C1, and current through the second capacitor C2, respectively. Because energy is being removed from the second capacitor, the polarity of the second current $I_{C2}$ is inverted from the first current $I_{C1}$.

During a first time period between times $t_1$ and $t_2$, the second switching device M2 is off and the third switching device M3 is on. Current flows from the first central node 114 through the inductor L1 and the third switching device M3, and the current I1 through the inductor L1 ramps up with a slope of $V_{C2}/L1$ creating a corresponding increase in magnitude of the $I_{C2}$ flowing through the second capacitor C2.

During a second time period between times $t_2$ and $t_3$, both switches M2, M3 are turned off. Turning off both switching devices M2, M3 prevents harmful shoot through currents.

During a third time period between times $t_3$ and $t_4$, the third switching device M3 remains off and the second switching device M2 is turned on. With the third switching device M3 turned off and the second switching device M2 turned on, the inductor current I1 flows through the second switching device M2 creating a corresponding first capacitor current $I_{C1}$ flowing in the first capacitor C1 thereby charging or increasing the voltage on the first capacitor C1.

During a fourth time period between times $t_4$ and is both the second switching device M2 and the third switching device M4 are turned off. The time intervals between times $t_2$ and $t_3$ and between times $t_4$ and is where both switching devices M2 and M3 are turned off are referred to as a dead band. A safe minimum amount of dead band is required to avoid having both switching devices M2 and M3 turned on at the same time. Increasing the amount of dead time above the safe minimum reduces the rate at which energy is transferred from the first capacitor to the second capacitor.

The above-described pattern between $t_1$ and is repeats periodically to transfer energy from the second capacitor C2 to the first capacitor C1 until the voltage of the second capacitor $V_{C2}$ falls below the predetermined inrush current threshold Vit.

Figure 4:
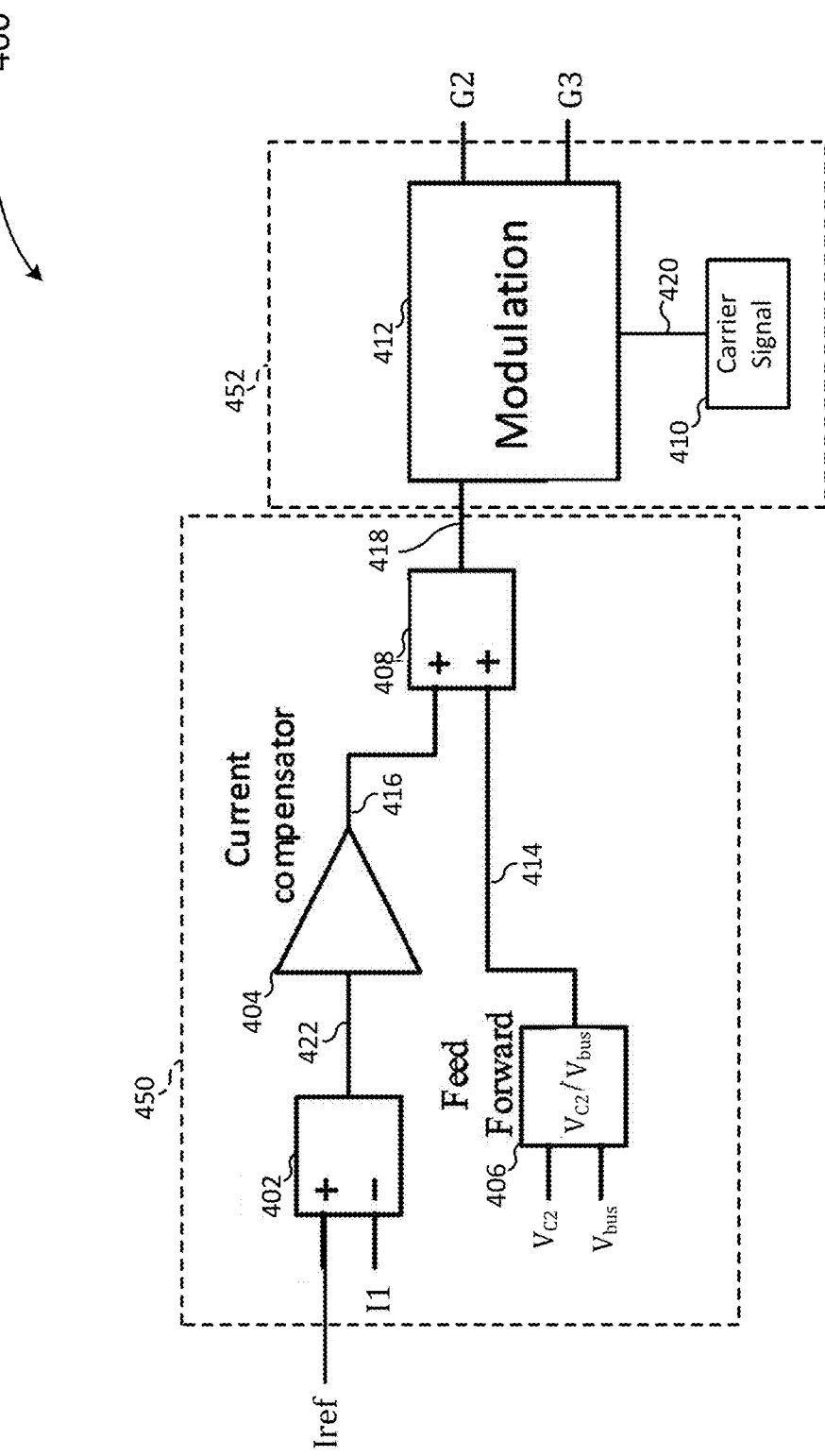
FIG. 4 illustrates a schematic block diagram of an exemplary current control scheme incorporating aspects of the disclosed embodiments.

FIG. 4 illustrates a schematic block diagram of an exemplary current control scheme 400 incorporating aspects of the disclosed embodiments. The exemplary current control scheme 400 is appropriate for use in the controller 118 of the power conversion apparatus 100 described above and with reference to FIG. 1. The exemplary current control scheme 400 provides a current loop for controlling inrush current during a start-up phase of the exemplary apparatus 100 and is operable during the third start-up state 206 when transferring energy from the second capacitor C2 to the first capacitor C1.

The exemplary control scheme 400 includes a current control loop 450 configured to receive a reference current Iref and a signal representing the current I1 flowing through the inductor L1. The current control loop 450 produces a switch control signal 418. The switch control signal 418 is received by a switch drive circuit 452 which is configured to produce a second switch drive signal G2 and a third switch drive signal G3. The second and third switch drive signals G2, G3 are configured to operate the second switching device M2 and the third switching device M3, respectively.

While the controller 118 is operating in the third start-up state 206, the reference current Iref is set to a predetermined value selected to maintain an inrush current Ii below a desired maximum amount. As an aid to understanding, the current loop 450 is illustrated as receiving the inductor current I1 directly. However in certain embodiments it may be beneficial to configure the current loop 450 to receive a low-level signal, such as a voltage signal or digital signal, with the low-level signal adapted to represent an amount of current I1 flowing through the inductor L1.

The inductor current I1 is subtracted 402 from the reference current Iref and generates a current error signal 422, which represents a difference between the actual inductor current I1 and the desired inductor current. Loop compensation is provided in the current loop 450 by applying a current compensation algorithm 404 to the current error signal 422 to produce a current control signal 416. The current compensation algorithm may be any suitable control algorithm such as proportional (P) compensation, proportional plus integral (PI) compensation, proportional plus integral plus derivative (PID) compensation, a type II compensation, or type III compensation.

A feed forward signal 414 is generated by dividing 406 a voltage $V_{C2}$ of the second capacitor C2 by the bus voltage $V_{bus}$. The feed forward signal 414 is then added to the current control signal 416 to produce a switch control signal 418.

A switch drive circuit 452 is configured to receive the switch control signal 418 produced by the current control loop 450 and modulate the switch control signal 418 to produce a second switch control signal G2 and a third switch control signal G3 to turn the second switching device M2 and the third switching device M3 on and off. The exemplary switch drive circuit 452 includes a signal generator 410 configured to generate a modulation signal 420. A modulator 412 combines the switch control signal 418 with the modulation signal 420 to produce the two switch control signals G2 and G3. The modulation signal 420 may be any suitable type of modulation signal, such as a triangle wave or a saw tooth wave, capable of producing switch control signals G2 and G3 that can operate the second switching device M2 and the third switching device M3 to transfer energy between the first capacitor C1 and the second capacitor C2 at a rate based on the switch control signal 418.

Figure 5:
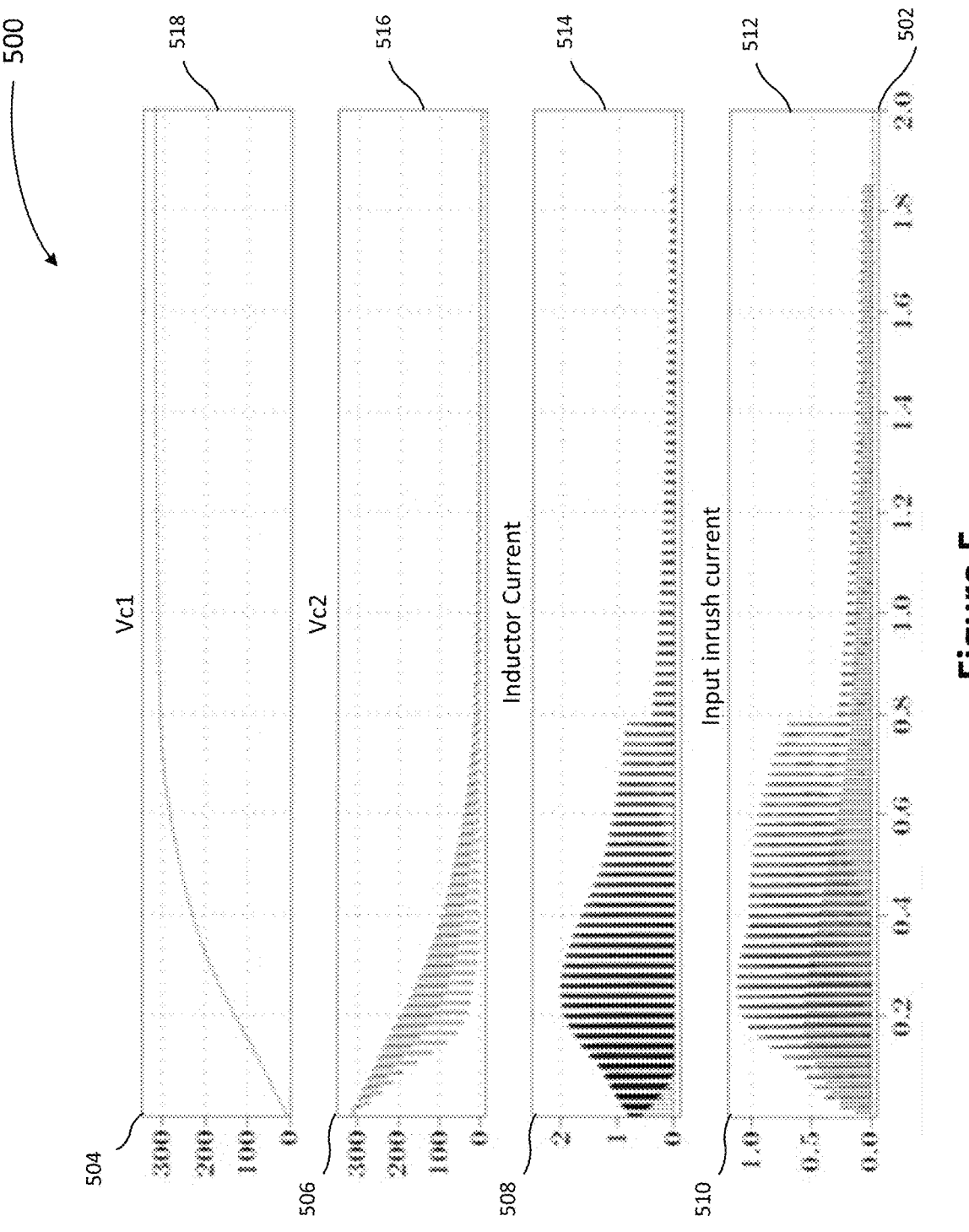
FIG. 5 illustrates graphs showing exemplary voltage and current waveforms for the start-up phase of a power conversion apparatus incorporating aspects of the disclosed embodiments.

FIG. 5 illustrates graphs 500 showing exemplary voltage and current waveforms for the start-up phase of a power conversion apparatus incorporating aspects of the disclosed embodiments. The exemplary voltage and current waveforms 500 show measured voltage and current waveforms of an exemplary power conversion apparatus, such as the apparatus 100 described above, during the third start-up state 206 while energy is being transferred from the second capacitor C2 to the first capacitor C1. In the graphs 500 time is depicted along a horizontal axis 502 increasing to the right.

Voltage $V_{C1}$ of the first capacitor C1 is shown in the top graph 518 with voltage being depicted on the vertical axis 504 in volts. Voltage $V_{C2}$ of the second capacitor C2 is shown in the second graph 516 with voltage being depicted on the vertical axis 506 in volts. Inductor current I1 is shown in the third graph 514 with current being depicted along a vertical axis 508 in amps. Inrush current is shown in the bottom graph 512 with current being depicted along a vertical axis 510 in amps.

While the energy transfer unit 102 is transferring energy from the second capacitor C2 to the first capacitor C1, voltage of the first capacitor C1 is increasing as shown in graph 518, and voltage of the second capacitor C2 is decreasing as shown in graph 516. The inductor L1 is used as an energy storage element to alternately remove energy from the second capacitor C2 and push energy to the first capacitor C1 as shown by the inductor current of graph 514. Controlling the energy transfer from the second capacitor C2 to the first capacitor C1 allows the inrush current to be limited as shown in the graph 512 where the inrush current is maintained below one (1) amp.

As described above, the exemplary apparatus 100 advantageously provides inrush current limiting during converter start-up by transferring energy from the smaller capacitance value second capacitor C2 to the larger capacitance value first capacitor C1. As will be discussed further below, the same energy transfer unit 102 can be exploited to extend hold-up time after loss of grid power by altering the control methodology.

Figure 6:
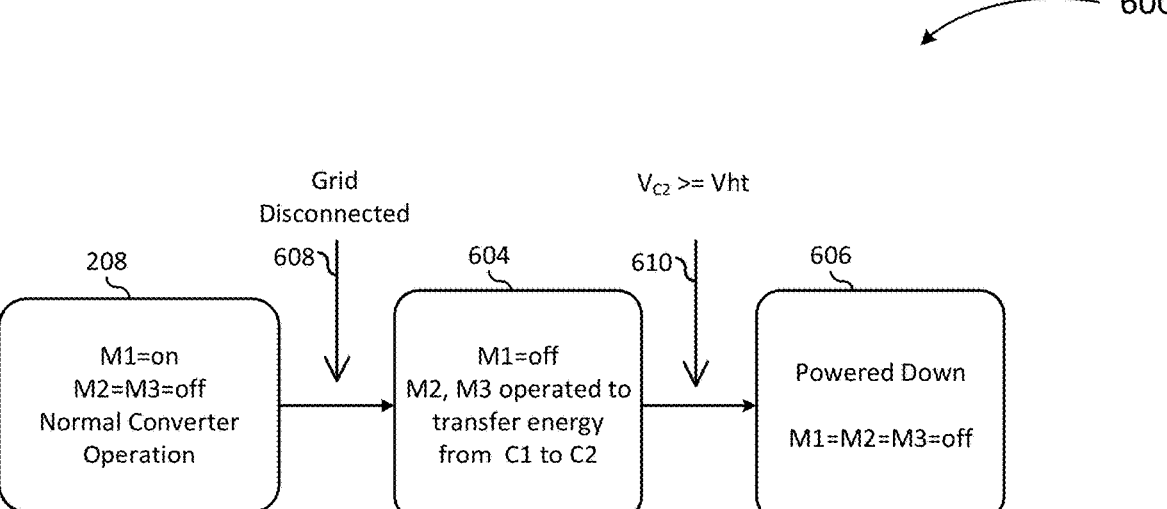
FIG. 6 illustrates a state chart depicting operational states of an exemplary AC-DC power conversion apparatus incorporating aspects of the disclosed embodiments.

FIG. 6 illustrates a state chart 600 depicting operational states 600 of an exemplary AC-DC power conversion apparatus incorporating aspects of the disclosed embodiments. The exemplary operational states 600 illustrate a methodology for extending hold-up time in AC-DC power conversion apparatus, such as the apparatus 100 described above and with respect to FIG. 1.

Hold-up time is the amount of time a power supply continues to deliver output power after grid power is lost or otherwise disconnected, and is an important characteristic of power supplies, such as power supplies used in data center applications. Hold-up time provides an opportunity for backup power to become active or for data processing equipment to gracefully shut down without data loss. Hold-up time is often defined as the time taken for an output voltage to fall below a threshold percentage, such as ninety percent (90%), of its nominal output voltage after loss of input power.

A power converter that is fully powered up and delivering stable DC output power to a load, such as the output power Vu described above, is referred to herein as being in a normal operational state or normal converter operation 208. During normal converter operation 208, the first switching device M1 is turned on thereby effectively removing the smaller capacitance value second capacitor C2 from the circuit and leaving the larger capacitance value first capacitor C1 as the primary energy storage element on the DC bus 120. During normal converter operation 208, no energy transfer is taking place and both the second switching device M2 and the third switching device M3 are turned off. Keeping both switching devices M2, M3 off prevents current from flowing through the inductor L1 and ensures efficient converter operation.

When grid power is lost, either by unplanned interruption or through deliberate removal, the converter transitions 608 to an energy transfer state 604 where energy transfer is beneficially employed to extend hold-up time of the converter. The first switching device M1 is turned off thereby coupling the first capacitor C1 and the second capacitor C2 in series across the DC bus 120. As the bus voltage $V_{bus}$ begins to fall, energy can be transferred from the first capacitor C1 to the second capacitor C2 to compensate for the falling bus voltage and extend the hold-up time of the converter. Because the second capacitor C2 has a smaller capacitance value than the first capacitor C1, the voltage drop of the first capacitor C1 caused by removal of an amount of energy is smaller than the voltage increase on the second capacitor C2, resulting from addition of the energy removed from the first capacitor C1. The controller 118 within the energy transfer unit 12 facilitates the energy transfer by operating the second switching device M2 and the third switching device M3 to transfer energy from the first capacitor C1 to the second capacitor C2.

As energy is transferred from the first capacitor C1 to the second capacitor C2 the efficacy of the energy transfer diminishes. Thus, when the voltage $V_{C2}$ of the second capacitor C2 becomes greater than or equal to a pre-determined hold-up threshold Vht, the converter transitions 610 to an off state 606. In the off state, all three switching devices M1, M2 and M3 are turned off and any remaining energy stored in the converter drains leaving the converter in a powered down state 606.

Figure 7:
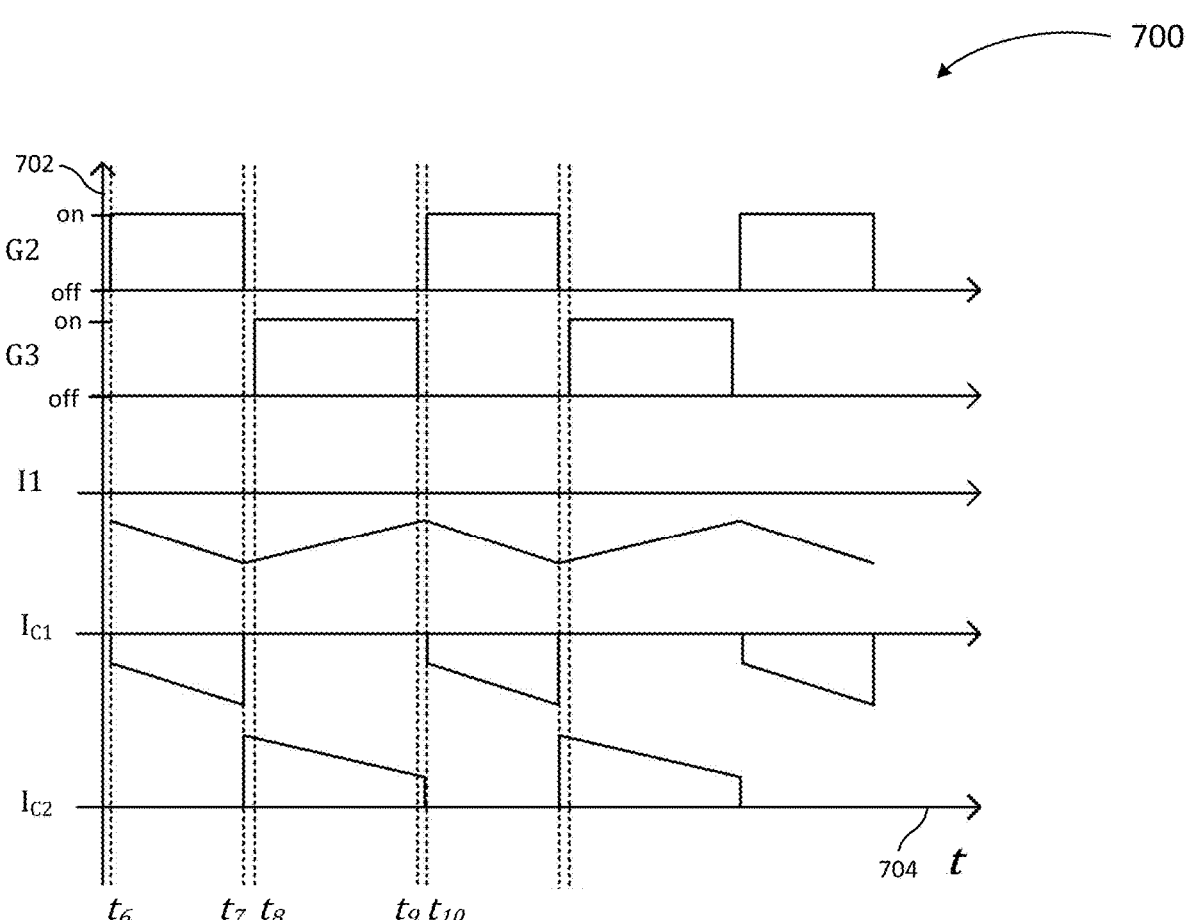
FIG. 7 illustrates a graph depicting primary waveforms of an exemplary energy transfer unit incorporating aspects of the disclosed embodiments.

FIG. 7 illustrates graphs depicting primary waveforms 700 of an exemplary energy transfer unit 102 incorporating aspects of the disclosed embodiments. The primary waveforms 700 may be generated by an energy transfer unit, such as the energy transfer unit 102, and are configured to transfer energy from the first capacitor C1 to the second capacitor C2 during a hold-up time extension state 604 as described above. In the graphs of the primary waveforms 700, time is depicted along a horizontal axis 704 increasing to the right, and signal magnitude is depicted along a vertical axis 702 increasing upwards. Note that due to the directional convention for current of the first capacitor $I_{C1}$ as selected in FIG. 1, the current $I_{C1}$ shows a negative current value.

The top two primary waveforms 700 labeled G2 and G3 show control signals used to operate the second switching device M2 and the third switching device M3 respectively. As an aid to understanding the graphs G2 and G3 are labeled according to the on or off state of the corresponding switching device M2 and M3, respectively. The bottom three primary waveforms 700 labeled as I1, $I_{C1}$, and $I_{C2}$ depict current through the inductor L1, current through the first capacitor C1, and current through the second capacitor C2 respectively.

During the first time period between $t_6$ and $t_7$, the second switching device M2 is turned on and the third switching device M3 is turned off. Energy is transferred from the first capacitor C1 through the second switching device M2 to the inductor L1, as can be seen in the increasing magnitude of the first capacitor current $I_{C1}$ and a corresponding increasing magnitude of the inductor current I1 during the time interval between $t_6$ and $t_7$. The magnitude of the inductor current I1 has a slope of about $(V_{bus} - V_{C2})/L$ while the second switching device M2 is on and the third switching device M3 is off.

During the next time period between times $t_7$ and is the second switching device M2 is turned off and the third switching device M3 remains off thereby preventing any shoot through current which could damage the switching devices and reduce converter efficiency.

The third switching device M3 is turned on at time is allowing the inductor current I1 to flow into the second capacitor C2 as can be seen in the second capacitor current $I_{C2}$ during the time interval between times $t_8$ and $t_9$. The inductor current I1 flowing into the second capacitor C2 charges the second capacitor C2 thereby increasing the voltage across the second capacitor $V_{C2}$, and completing the energy transfer from the first capacitor C1 to the second capacitor C2. Because the capacitance value of the second capacitor C2 is smaller than the capacitance value of the first capacitor C1, the voltage drop on the first capacitor C1 caused by removal of an amount of energy, is smaller than the voltage gain of the second capacitor C2 caused by adding the same amount of energy removed from the first capacitor C1, thereby compensating reduction in the bus voltage $V_{bus}$ and extending the hold-up time.

At time $t_9$ the third switching device M3 is turned off and the second switching device M2 remains off creating a second period of dead time between $t_9$ and $t_{10}$. As discussed above the two intervals of dead time, between $t_7$ and is and between $t_9$ and $t_{10}$, should be long enough to prevent any shoot through current and can be adjusted in length to regulate the rate of energy transfer from the first capacitor C1 to the second capacitor C2.

The above-described pattern between $t_6$ and $t_{10}$ repeats periodically to transfer energy from the first capacitor C1 to the second capacitor C2 until the voltage of the second capacitor $V_{C2}$ rises above the predetermined hold-up time threshold Vht.

Figure 8:
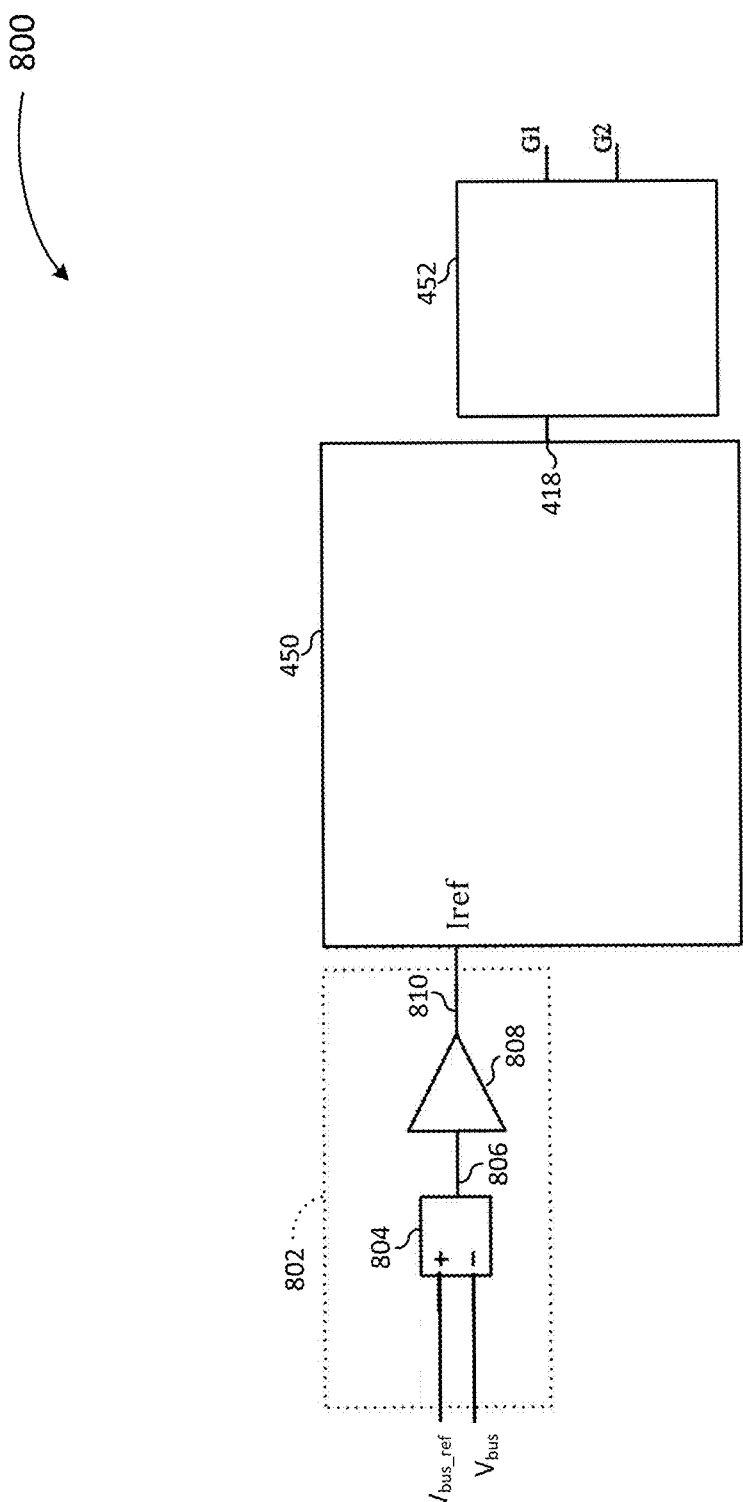
FIG. 8 illustrates a schematic block diagram of an exemplary voltage control loop incorporating aspects of the disclosed embodiments.

FIG. 8 illustrates an exemplary voltage control scheme 800 incorporating aspects of the disclosed embodiments. The exemplary voltage control scheme 800 is appropriate for operating switching devices in an energy transfer unit, such as the first and second switching devices M1, M2 in the exemplary energy transfer unit 102 described above and with reference to FIG. 1. The voltage control scheme 800 employs a voltage control loop 802 to maximize hold-up time of an AC-DC power converter apparatus, such as the apparatus 100 described above, by controlling transfer of energy from the first capacitor C1 to the second capacitor C2.

In the exemplary voltage control scheme 800, a voltage control loop 802 receives a reference voltage $V_{ref\_bus}$ representing a desired DC bus voltage, and a DC bus voltage $V_{bus}$ signal which may be the actual DC bus voltage $V_{bus}$ or a signal representing the actual DC bus voltage $V_{bus}$. Comparing or subtracting 804 the reference voltage $V_{ref\_bus}$ and the actual DC bus voltage $V_{bus}$ produces a voltage error signal 806 representing a difference between the desired DC bus voltage $V_{ref\_bus}$ and the actual DC bus voltage $V_{bus}$.

A voltage loop compensation algorithm 808 is applied to the voltage error signal 806 to produce a voltage control signal 810. The voltage loop compensation algorithm 808 is selected to ensure the DC bus voltage $V_{bus}$ produced by the voltage control scheme 800 meets various desired performance criteria such as stability, response time, or other desired control criteria. In certain embodiments the voltage loop compensation algorithm 808 may be a proportional control algorithm (P), a proportional plus integral (PI) control algorithm, a proportional plus integral plus derivative (PID) algorithm, a type II or type III algorithm, or any appropriate loop compensation algorithm configured to ensure stability and desired performance of the voltage control scheme 800.

The voltage control signal 810 is then applied as the reference current Iref to the current loop 450 described above and with reference to FIG. 4. A switch control signal 418 is generated by the current loop 450 and used by the switch drive circuit 452 to produce a second switch drive signal G2 and a third switch drive signal G3, which operate the second and third switching devices, M2 and M3, to transfer energy from the first capacitor C1 to the second capacitor C2. The voltage control loop 802 is configured to extend the hold-up time of the AC-DC conversion apparatus 100 by controlling energy transferred from the first capacitor C1 to the second Capacitor C2 during a time period beginning after the grid power is lost or disconnected.

Figure 9:
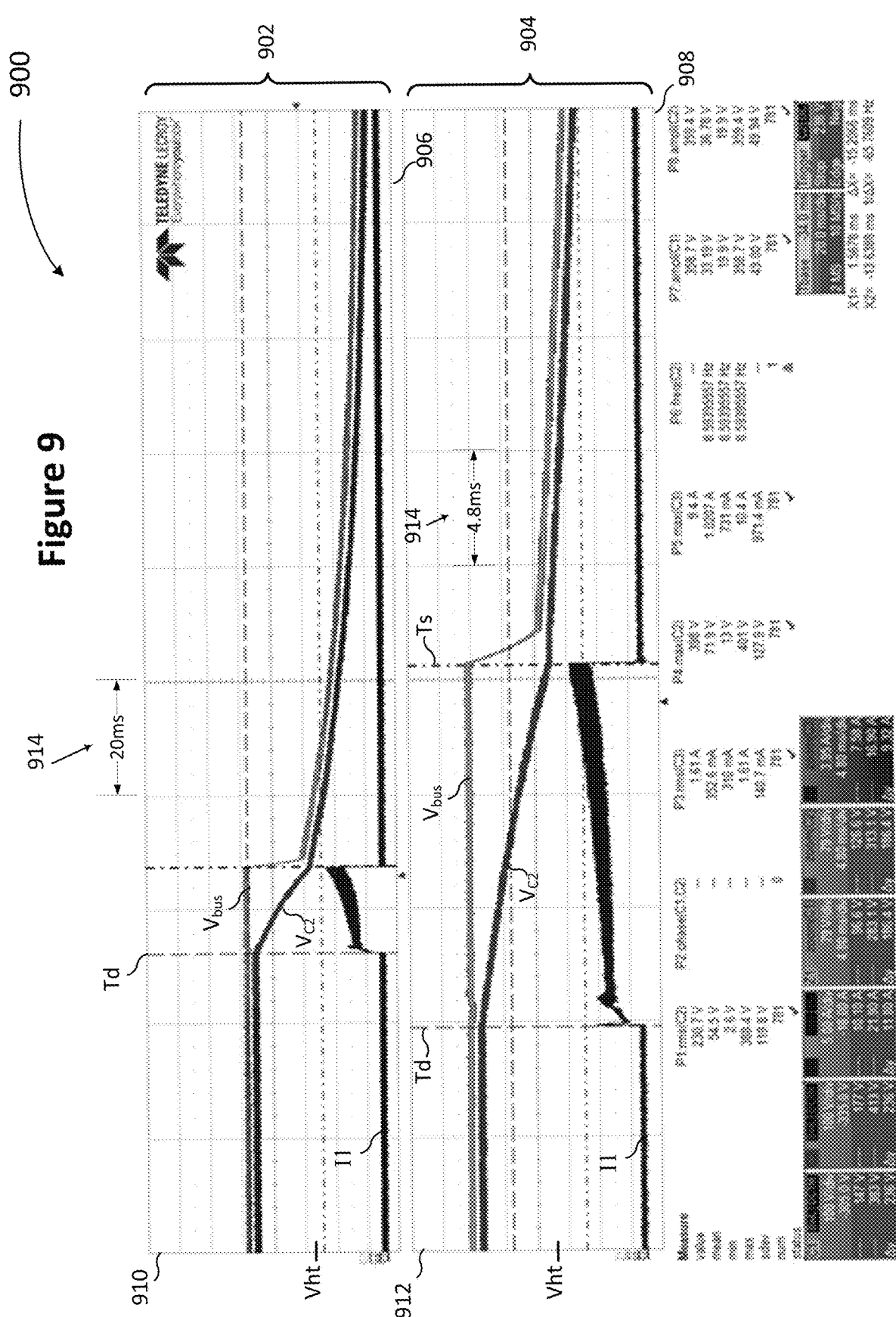
FIG. 9 illustrates graphs showing converter voltage and current waveforms during hold-up time extension incorporating aspect of the disclosed embodiments.

FIG. 9 illustrates graphs 900 showing converter voltages and current waveforms during hold-up time extension incorporating aspect of the disclosed embodiments. The graphs 900 show two sets of waveforms 902, 904 for the bus voltage $V_{bus}$, the second capacitor voltage $V_{C2}$, and inductor current I1. In the graphs 900, time is depicted along horizontal axes 906, 908 increasing to the right, and signal magnitude is depicted along vertical axes 910, 912 increasing upwards. The second set of graphs 904 show the same waveforms as the first set of graphs 902 with the second set of graphs 904 having expanded time 908 and magnitude 912 scales. The first set of graphs 902 has time scale of 20 milliseconds per division 914, and the second set of graphs 904 has a time scale of 4.9 milliseconds per division 916. The vertical axes 910 for the upper set of waveforms use 100 volts per division for the bus voltage $V_{bus}$, 100 volts per division for the second capacitor voltage $V_{C2}$, and 5 amperes per division for the inductor current I1. The vertical axis 912 for the second set of waveforms 904 use 79 volts per division for the bus voltage $V_{bus}$, 79 volts per division for the second capacitor voltage $V_{C2}$, and 3.95 amperes per division for the inductor current I1.

At a first time Td the grid voltage is disconnected 608 and the controller 118 turns off the first switching device M1 and begins operating the second M2 and third M3 switching devices to transfer energy from the first capacitor C1 to the second capacitor C2. At a second time Ts the second capacitor voltage $V_{C2}$ falls below a holdup threshold Vht causing the controller 118 to end or discontinue the energy transfer and allow the bus voltage $V_{bus}$ to drop and then decay as energy drains from the system.

As can be seen in the graphs 900, the inductor current I1 increases as energy is transferred from the first capacitor C1 to the second capacitor C2. In one embodiment, selection of the hold-up threshold Vht may be based on a maximum desired inductor current I1.

Figure 10:
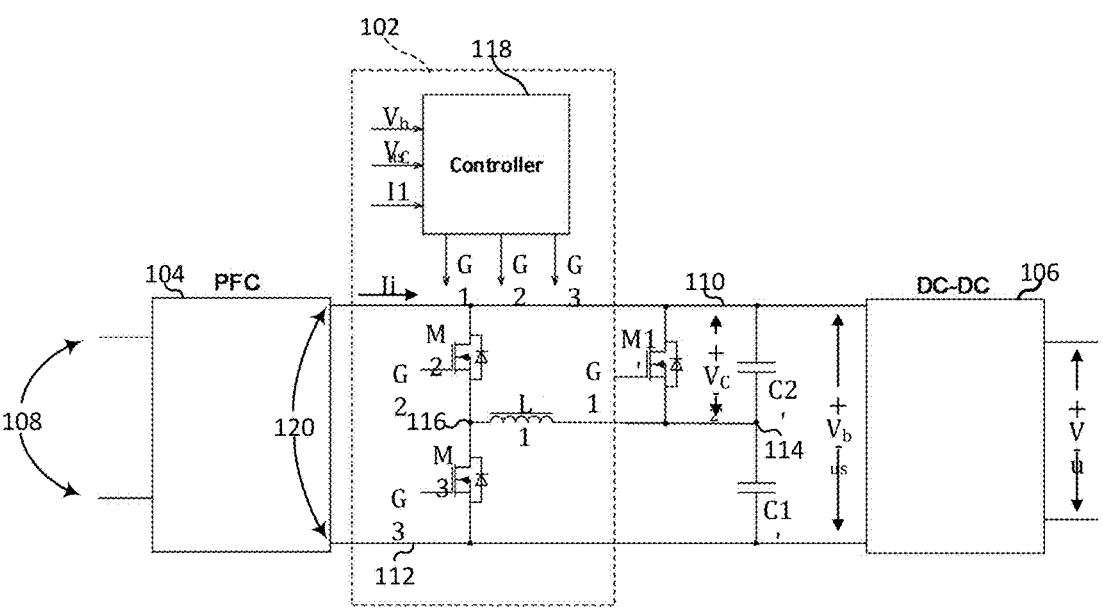
FIG. 10 illustrates a schematic block diagram showing an alternate embodiment of an exemplary AC-DC power conversion apparatus incorporating aspects of the disclosed embodiments.

FIG. 10 illustrates a block diagram showing an alternate embodiment 1000 of an exemplary AC-DC power conversion apparatus incorporating aspects of the disclosed embodiments. The alternate embodiment 1000 is similar to the exemplary apparatus 100 described above with the locations of the first C1 and second C2 capacitors swapped. In the apparatus 100 the larger capacitance value first capacitor C1 is connected to the positive DC bus 110 and the smaller capacitance value second capacitor C2 is connected to the negative DC bus 112. The first switching device M1 is connected between the central node 114 and the negative DC bus.

In an alternate embodiment 1000, the larger capacitance value first capacitor C1' is connected to the negative DC bus 112 and the smaller capacitance value second capacitor C2' is connected to the positive DC bus 110, with the first switching device M1' connected between the central node 114 and the positive DC bus 110. The alternate embodiment 1000 provides the same inrush current control and hold-up time extension as the exemplary apparatus 100 and provides additional design flexibility which can benefit specific applications.

Figure 11:
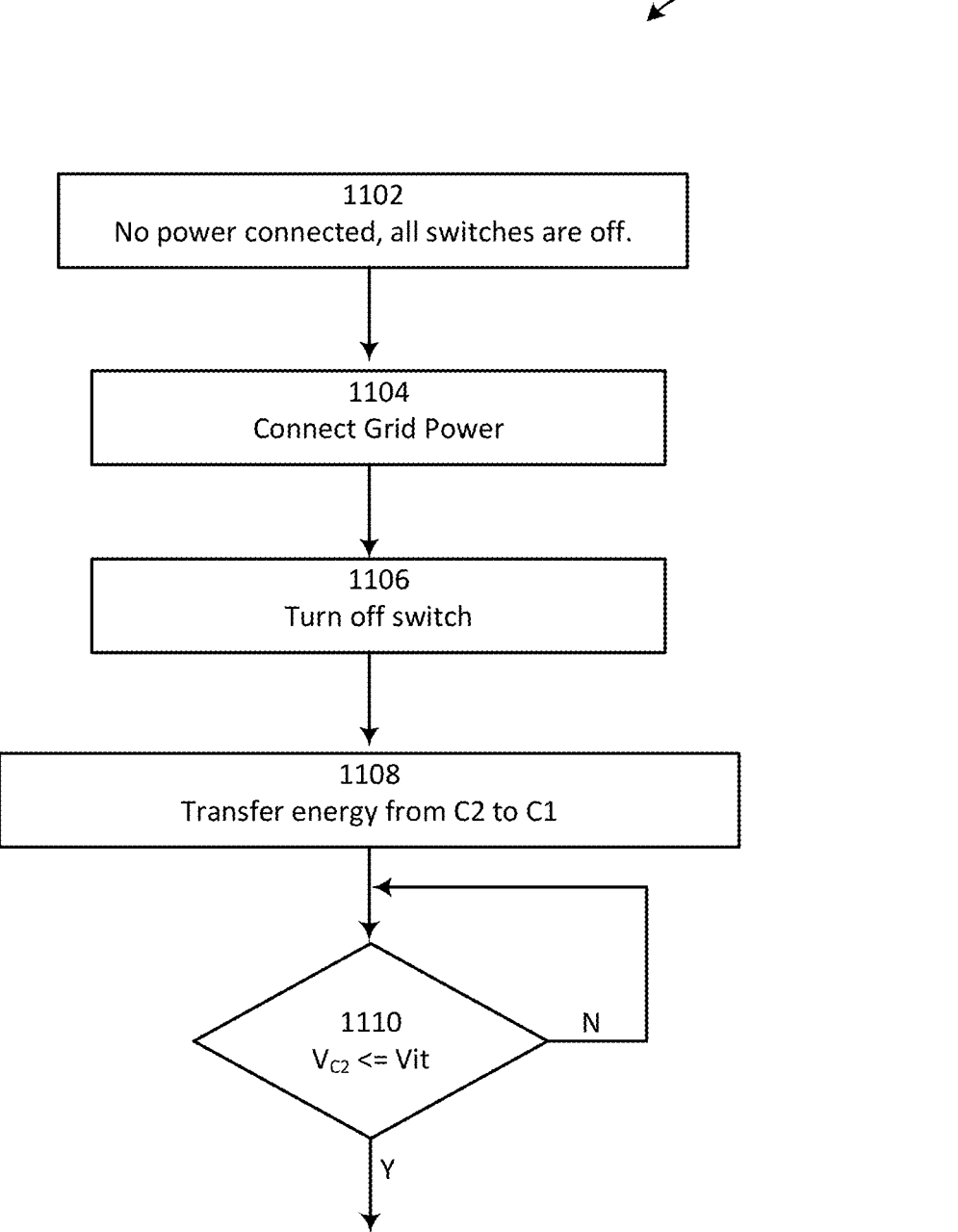
FIG. 11 illustrates a flow chart of an exemplary method for controlling inrush current in an AC-DC power conversion apparatus incorporating aspects of the disclosed embodiments.

FIG. 11 illustrates a flow chart of an exemplary method 1100 for controlling inrush current in an AC-DC power conversion apparatus incorporating aspects of the disclosed embodiments. The exemplary method 1100 of the disclosed embodiments is appropriate for transferring energy in an AC-DC power conversion apparatus, such as the AC-DC power conversion apparatus 100 described above and with reference to FIG. 1. The exemplary method 1100 is configured for use on an AC-DC power conversion apparatus where the apparatus includes a power factor correction stage configured to receive a grid power and produce a DC bus power, and a DC to DC conversion stage configured to receive the DC bus power and produce a DC output power appropriate for providing power to a DC load such as data center equipment or other equipment requiring stable conditioned DC power.

In the AC-DC conversation apparatus, a first capacitor and a second capacitor are connected in series across the DC bus power with a switching device connected in parallel with the second capacitor. The first capacitor has a larger capacitance value, such as fifty (50), one hundred (100) or more, times larger, than the capacitance value of the second capacitor.

The switching device is configured to short and essentially remove the second capacitor from the circuit when the switching device is turned on. The switching device may be any appropriate switching device such as the first switching device M1 described above with reference to the exemplary apparatus 100.

The exemplary method 1100 begins when the power conversion apparatus is disconnected from the grid power 1102 and all energy is drained from the apparatus. Grid power is then connected 1104 to the power conversion apparatus and electric energy begins to enter the apparatus.

The method turns off the switching device 1106 thereby engaging the lower capacitance created by the series connected first capacitor and second capacitor. This lower capacitance value is small enough to prevent an excessive amount of inrush current.

Energy is then transferred 1108 from the smaller capacitance value second capacitor to the larger capacitance value first capacitor in a controlled fashion creating what may be viewed as a trickle charging current for the first capacitor. By appropriately controlling the energy transfer, the inrush current may be beneficially maintained below a desired maximum value, thereby avoiding undesired stress on conversion apparatus components.

The energy transfer continues to trickle charge the first capacitor until 1110 the voltage on the second capacitor $V_{C2}$ falls below an inrush threshold Vit. Once the voltage on the second capacitor falls below the inrush threshold, $V_{C2}<=$Vit, the method stops transferring energy from the first capacitor to the second capacitor and turns the switching device on 1112. Turning on the switching device shorts the second capacitor, effectively removing the smaller second capacitor from the circuit. The full energy storage capacity of the larger capacitance value first capacitor is thus applied to the DC bus power thereby making the full filtering and larger energy storage capabilities of the first capacitor available to the DC bus power.

Figure 12:
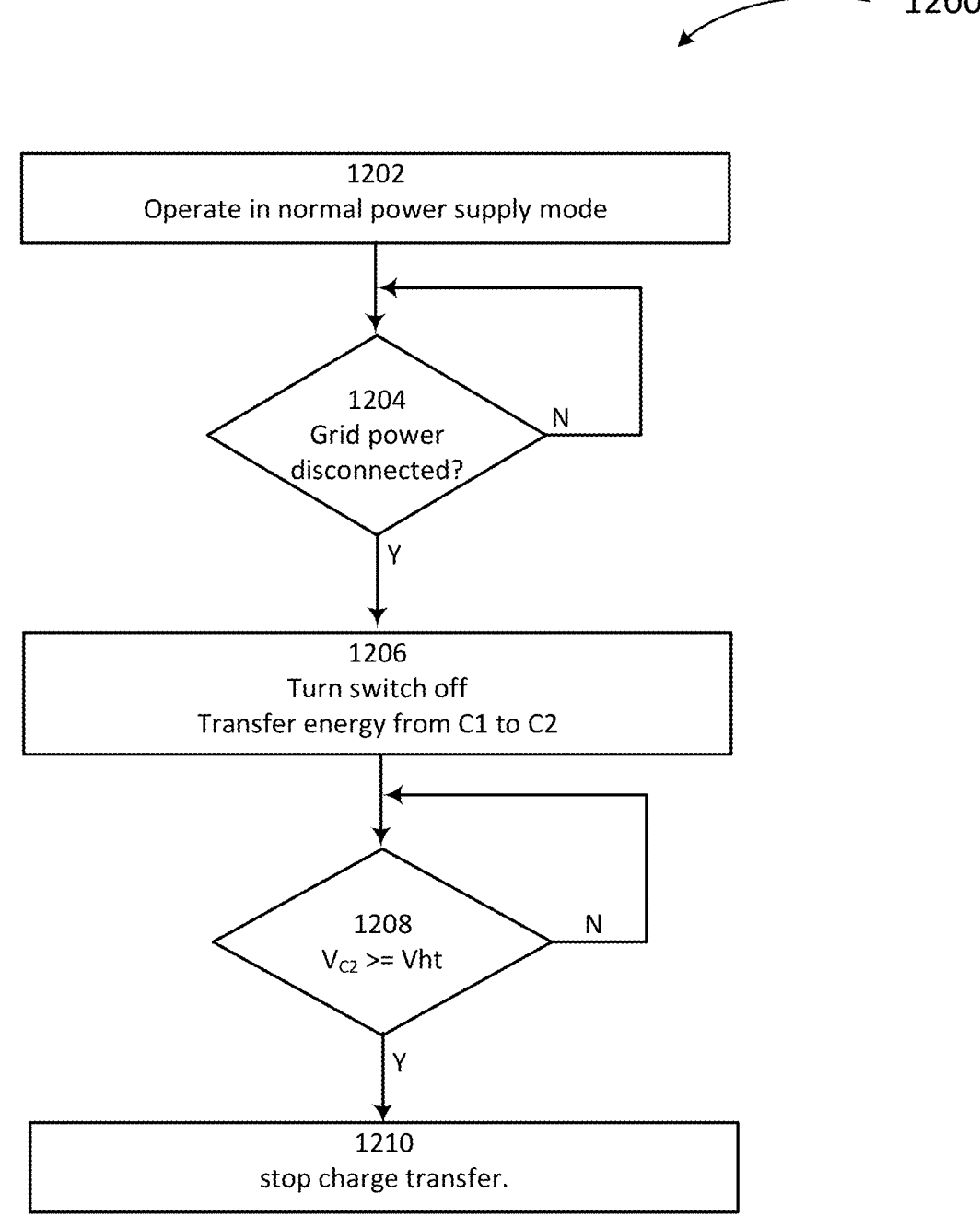
FIG. 12 illustrates a flow chart of an exemplary method for extending hold-up time in an AC-DC power conversion apparatus incorporating aspects of the disclosed embodiments.

FIG. 12 illustrates a flow chart of an exemplary method 1200 for extending hold-up time in an AC-DC conversion apparatus incorporating aspects of the disclosed embodiments. The exemplary method 1200 extends the exemplary method 1100 described above and with reference to FIG. 11 and is appropriate for the same AC-DC power conversion apparatus described above. The exemplary method 1200 begins 1202 while the AC-DC power conversion apparatus is operating in a normal power supply mode where grid power is connected and a stable conditioned output power is being delivered to the load. During normal power supply mode the switching device is turned on and the smaller second capacitor is effectively removed from the circuit. The method monitors grid power 1204 to determine when grid power is disconnected.

When grid power is disconnected the switching device is turned off 1206 thereby introducing the second capacitor back into the circuit. Energy is transferred 1206 from the larger first capacitor to the smaller second capacitor in a controlled fashion to compensate for a drop in bus voltage caused by power being delivered to the load. Energy transfer from the first capacitor to the second capacitor is controlled based on a voltage control loop, such as the voltage loop described above and with reference to FIG. 8. The voltage loop is configured to compensate for reductions in the bus voltage caused by delivering energy remaining in the conversion apparatus to the load.

During the energy transfer, the voltage of the second capacitor $V_{C2}$ is monitored 1208 to determine when the second capacitor voltage $V_{C2}$ drops below a predetermined hold-up threshold Vht. When the second capacitor voltage $V_{C2}$ drops below the hold-up threshold Vht energy transfer is stopped 1210 and the energy in the AC-DC conversion apparatus decays until all energy in the system is dissipated.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:

a power factor correction stage configured to receive an alternating (AC) input voltage and to produce a direct current (DC) correction stage output signal over a power bus comprising a positive output node and a negative output node;

a DC-to-DC conversion stage coupled to receive the DC correction stage output signal to produce a DC output power (Vu);

a first capacitor C1 coupled in series with a second capacitor C2 between the positive output node and a negative output node, wherein a first central node is disposed between the first capacitor and the second capacitor;

a first switching device coupled in parallel with the second capacitor; and an energy transfer unit coupled to the positive output node and the negative output node and to the first central node, the energy transfer unit being configured to control the first switching device to turn on and off to transfer energy between the first capacitor and the second capacitor, wherein a capacitance value of the first capacitor is greater than a capacitance value of the second capacitor; and when the AC input voltage is disconnected or not present, the energy transfer unit is configured to turn off the first switching device and increase a hold up time by transferring energy from the first capacitor to the second capacitor.

2. The apparatus according to claim 1, wherein the capacitance value of the first capacitor is at least fifty (50) times greater than the capacitance value of the second capacitor.

3. The apparatus according to claim 1, wherein the energy transfer unit is further configured to turn off the first switching device and control an inrush current by transferring energy from the second capacitor to the first capacitor.

4. The apparatus according to claim 2, wherein the energy transfer unit is further configured to, when a grid power is connected, turn off the first switching device and control an inrush current by transferring energy from the second capacitor to the first capacitor.

5. The apparatus of claim 1 wherein the energy transfer unit comprises:

a second switching device coupled in series with a third switching device between the positive and negative output nodes, a second central node being disposed between the second switching device and the third switching device;

an inductor coupled between the first central node and the second central node; and a controller configured to operate the first switching device the second switching device and the third switching device, wherein the controller is configured to turn off the first switching device to transfer energy between the first capacitor and the second capacitor by operating the second switching device and the third switching device.

6. The apparatus according to claim 5 wherein the controller is configured to:

when AC input voltage is connected and a voltage of the second capacitor ($V_{C2}$) is greater than an inrush threshold (Vit), hold the first switching device in an off state and operate the second switching device and the third switching device to transfer energy from the second capacitor to the first capacitor; and when a voltage of the second capacitor is less than or equal to the inrush threshold, turn on the first switching device, turn off the second switching device, and turn off the third switching device.

7. The apparatus according to claim 1 wherein the controller is configured to:

when AC input voltage is disconnected or not present, turn off the first switching device and operate the second switching device and a third switching device to transfer energy from the first capacitor to the second capacitor; and when the voltage of the second capacitor is greater than or equal to a holdup threshold, turn off the first switching device, turn off the second switching device, and turn off the third switching device.

8. The apparatus of claim 1 wherein the energy transfer unit is configured to transfer energy between the second capacitor and the first capacitor based on a current loop, wherein the current loop is configured to:

produce a current error signal by subtracting an inductor current from a reference current;

produce a current control signal by applying a current compensation algorithm to the current error signal;

produce a feed forward signal by dividing the voltage of the second capacitor by the bus voltage;

produce a switch control signal by adding the current control signal and the feed forward signal; and produce a second switch control signal and a third switch control signal by modulating the switch control signal with a carrier signal, wherein the second switch control signal (G2) and the third switch control signal are configured to operate the second switching device and the third switching device.

9. The apparatus according to claim 8 wherein the current compensation algorithm comprises one of a proportional algorithm, a proportional plus integral algorithm, a proportional plus integral plus derivative algorithm, a type II algorithm, and a type III algorithm.

10. The apparatus according to claim 8 wherein the reference current comprises a predetermined reference current value.

11. The apparatus according to claim 8 wherein the energy transfer unit is configured to transfer energy from the first capacitor to the second capacitor based on a voltage loop wherein the voltage loop is configured to:

produce a voltage error signal by subtracting the bus voltage from a voltage reference; and produce the reference current by applying a voltage compensation algorithm to the voltage error signal.

12. The apparatus according to claim 11 wherein the voltage compensation algorithm comprises one of a proportional algorithm, a proportional plus integral algorithm, a proportional plus integral plus derivative algorithm, a type II algorithm, and a type III algorithm.

13. The apparatus according to claim 1 wherein the first capacitor is connected to the positive DC bus and the second capacitor is connected to a negative DC bus.

14. The apparatus according to claim 1 wherein the first capacitor is connected to the negative DC bus and the second capacitor is connected to a positive DC bus.

15. A method for operating a power conversion apparatus, wherein the power conversion apparatus comprises:

a power factor correction stage receiving a grid power and producing a DC bus power;

a DC to DC conversion stage receiving the DC bus power and producing a DC output power, determining grid power to the power factor correction stage is not present;

turning the switching device off;

transferring an energy from the second capacitor to the first capacitor based on a current control loop;

when a voltage of the second capacitor is less than or equal to an inrush threshold, turn the switching device on and discontinue transferring energy from the second capacitor to the first capacitor; and when a voltage of the second capacitor is greater than a holdup threshold, discontinue transferring energy from the first capacitor to the second capacitor.

16. The method according to claim 15 further comprising:

operating the power conversion apparatus in a normal power supply mode;

when a loss of the grid power is detected, turning the switching device off and transferring energy from the first capacitor to the second capacitor based on a voltage control loop.

* * * * *